United States Patent
Kim et al.

(10) Patent No.: US 10,856,168 B2
(45) Date of Patent: Dec. 1, 2020

(54) METHOD FOR PERFORMING MEASUREMENT FOR AERIAL UE IN WIRELESS COMMUNICATION SYSTEM AND A DEVICE THEREFOR

(71) Applicant: LG Electronics Inc., Seoul (KR)

(72) Inventors: Hongsuk Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/317,673

(22) PCT Filed: Apr. 17, 2018

(86) PCT No.: PCT/KR2018/004423
§ 371 (c)(1),
(2) Date: Jan. 14, 2019

(87) PCT Pub. No.: WO2018/194338
PCT Pub. Date: Oct. 25, 2018

(65) Prior Publication Data
US 2019/0166516 A1    May 30, 2019

Related U.S. Application Data

(60) Provisional application No. 62/488,143, filed on Apr. 21, 2017.

(51) Int. Cl.
*H04W 24/10* (2009.01)
*H04W 36/30* (2009.01)
(Continued)

(52) U.S. Cl.
CPC .......... *H04W 24/10* (2013.01); *H04W 36/30* (2013.01); *H04W 36/0058* (2018.08); *H04W 84/06* (2013.01)

(58) Field of Classification Search
CPC ............................ H04W 24/10; H04W 36/30
See application file for complete search history.

(56) References Cited

U.S. PATENT DOCUMENTS 9,148,215 B1    9/2015    Bonawitz
9,537,561 B1 *  1/2017    Kotecha ............. H04B 7/18506
(Continued)

FOREIGN PATENT DOCUMENTS

JP    2011182458    9/2011
JP    2016530770    9/2016
(Continued)

OTHER PUBLICATIONS

NTT DOCOMO, "Initial views on potential problems and solutions for aerial vehicles", 3GPP TSG RAN WG1 Meeting #88bis, R1-1705699, Mar. 25, 2017 See p. 4. (Year: 2017).*
(Continued)

*Primary Examiner* — Zhiren Qin
(74) *Attorney, Agent, or Firm* — Fish & Richardson P.C.

(57) ABSTRACT

The present invention relates to a wireless communication system. More specifically, the present invention relates to a method and a device for performing measurement for aerial UE in wireless communication system, the method comprising: informing a network of location information of the UE, which is used for figuring the network out current status of the UE which is in airborne status or is staying or hovering on the ground; receiving triggering conditions for measurement reporting which is associated with the informed location information of the UE; performing a measurement for a serving cell; and reporting result of the measurement to the serving cell if at least one of the triggering condition for the serving cell is met.

14 Claims, 13 Drawing Sheets

(51) Int. Cl.
*H04W 84/06* (2009.01)
*H04W 36/00* (2009.01)

(56) References Cited

U.S. PATENT DOCUMENTS

| | | | |
|---|---|---|---|
| 9,783,286 B1* | 10/2017 | Yang | B64C 39/024 |
| 2011/0300807 A1* | 12/2011 | Kwun | H04W 24/10 455/63.1 |
| 2013/0215772 A1 | 8/2013 | Kaur et al. | |
| 2013/0329635 A1* | 12/2013 | Lee | H04W 24/10 370/328 |
| 2014/0024357 A1* | 1/2014 | Koskinen | H04W 36/0088 455/418 |
| 2014/0066092 A1 | 3/2014 | Scheim et al. | |
| 2015/0092686 A1* | 4/2015 | Cui | H04W 48/16 370/329 |
| 2016/0088498 A1 | 3/2016 | Sharawi | |
| 2016/0157165 A1 | 6/2016 | Xie et al. | |
| 2017/0025021 A1 | 1/2017 | Song et al. | |
| 2017/0032587 A1 | 2/2017 | Cheatham, III et al. | |
| 2017/0034709 A1* | 2/2017 | Hapsari | H04W 24/00 |
| 2017/0092138 A1 | 3/2017 | Trundle et al. | |
| 2017/0325244 A1* | 11/2017 | Zhang | H04W 24/10 |
| 2018/0336789 A1* | 11/2018 | Damnjanovic | B64C 39/024 |
| 2019/0053244 A1* | 2/2019 | Mildh | H04W 72/046 |
| 2019/0077508 A1* | 3/2019 | Shimezawa | H04B 17/382 |

FOREIGN PATENT DOCUMENTS

| | | |
|---|---|---|
| JP | 2017069985 | 4/2017 |
| WO | WO2017039077 | 3/2017 |
| WO | WO2018042927 | 6/2019 |

OTHER PUBLICATIONS

LG Electronics, "Potential enhancements to LTE for aerial vehicles", 3GPP TSG RAN WG1 Meeting #88bis, R1-1704855, Mar. 25, 2017 See p. 2. (Year: 2017).*

Extended European Search Report in EP Patent Application No. 18788024.0, dated Oct. 18, 2019, 13 pages.

LG Electronics Inc., "Handover Support using Positioning Identification," R2-1713788, 3GPP TSG-RAN2 RAN2 Meeting RAN2 #100, Reno, USA, Nov. 27-Dec. 1, 2017, 3 pages.

LG Electronics Inc., "Mobility Enhancement using Location Information," R2-1802705, 3GPP TSG-RAN WG2 Meeting #101, Athens, Greece, Feb. 26-Mar. 2, 2018, 3 pages.

NTT DOCOMO, Inc., "Potential challenges on emerging drone services," R2-1701077, 3GPP TSG-RAN WG2 #97, Athens, Greece, Feb. 13-17, 2017, 4 pages.

PCT International Search Report and Written Opinion in International Appln. No. PCT/KR2018/004423, dated Jul. 27, 2018, 10 pages.

Intel Corporation, "RLM enhancement for eNB-IoT and FeMTC," R2-1702997, 3GPP TSG-RAN WG2 #97bis, Spokane, Washington, USA, dated Apr. 3-7, 2017, 4 pages.

Japanese Office Action in Japanese Application No. 2019-527122, dated Jul. 14, 2020, 6 pages (with English translation).

* cited by examiner

【Figure 1】
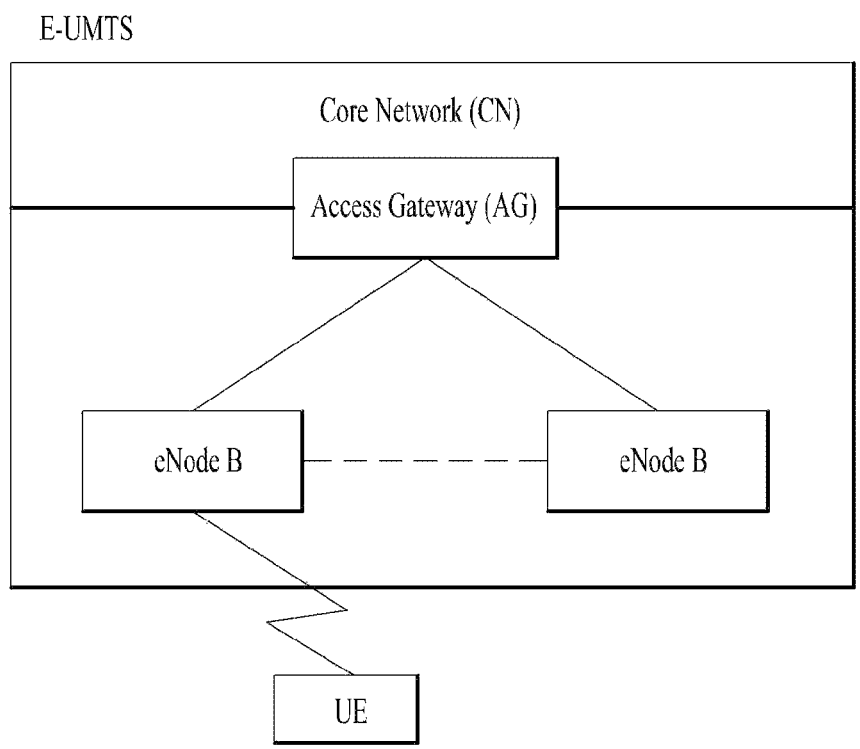

[Figure 2]
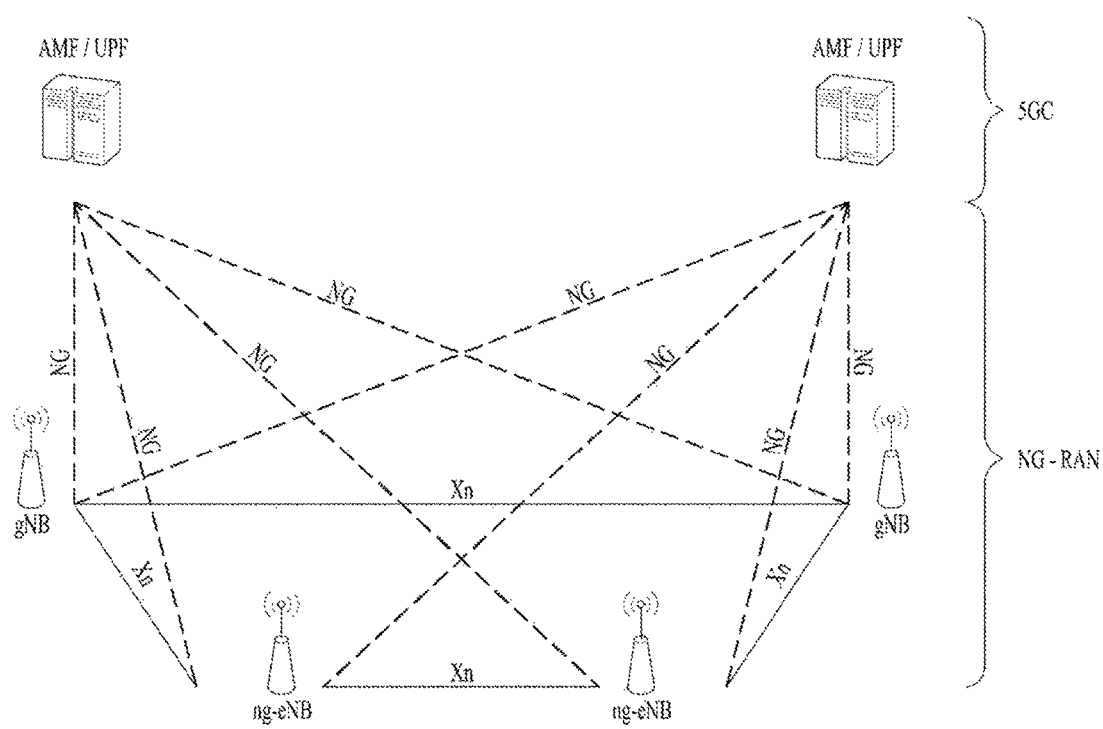

【Figure 3a】
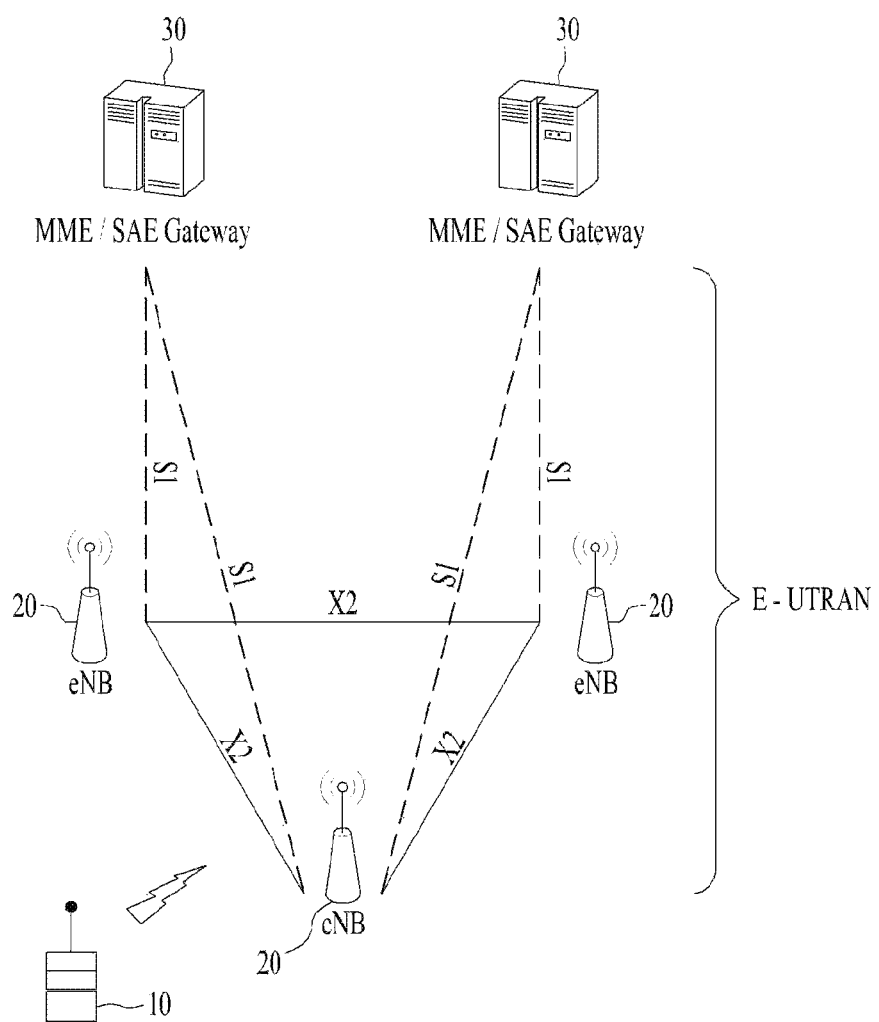

【Figure 3b】
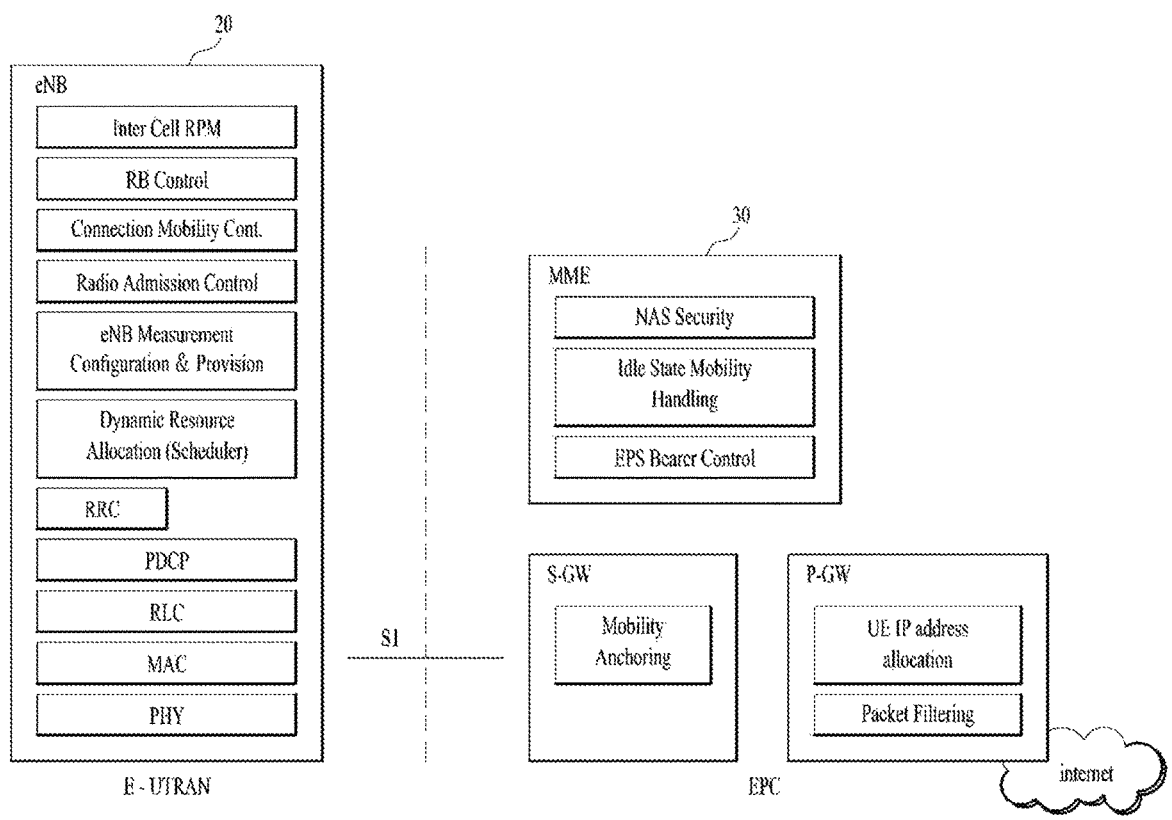

[Figure 4]
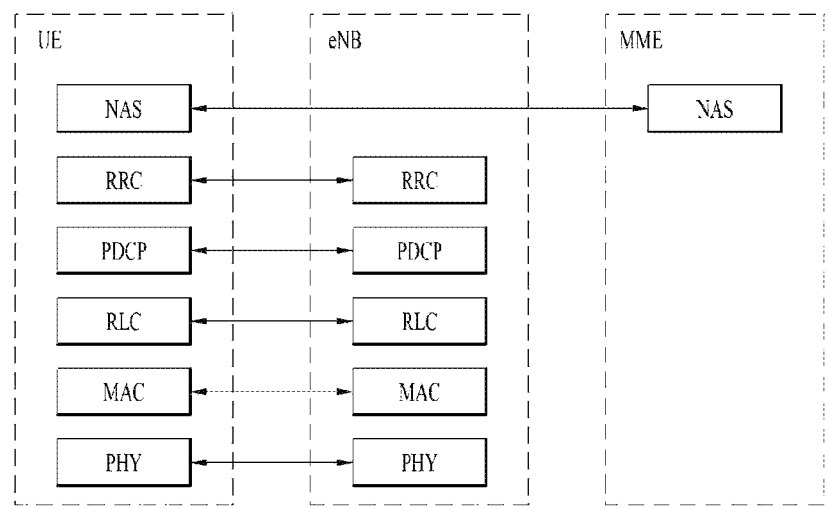
(a) Control-Plane Protocol Stack
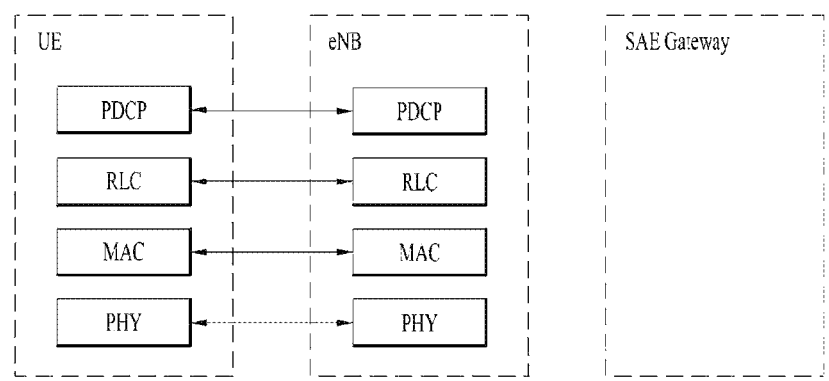
(b) User-Plane Protocol Stack

[Figure 5]
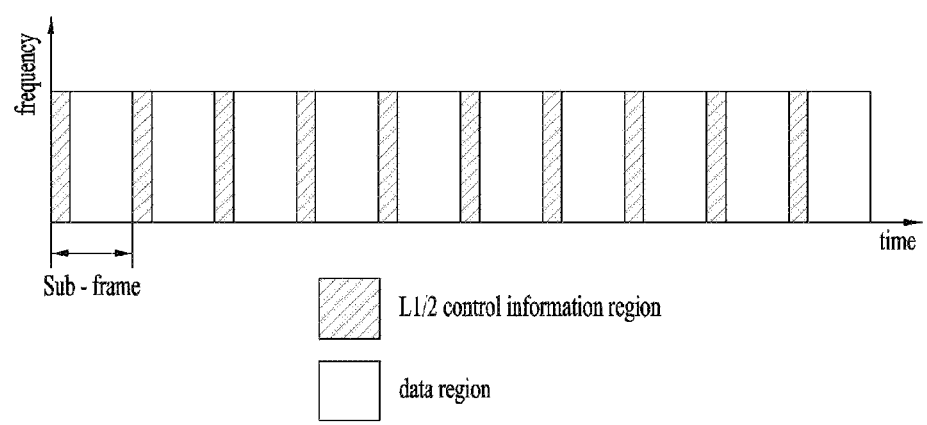

[Figure 6]
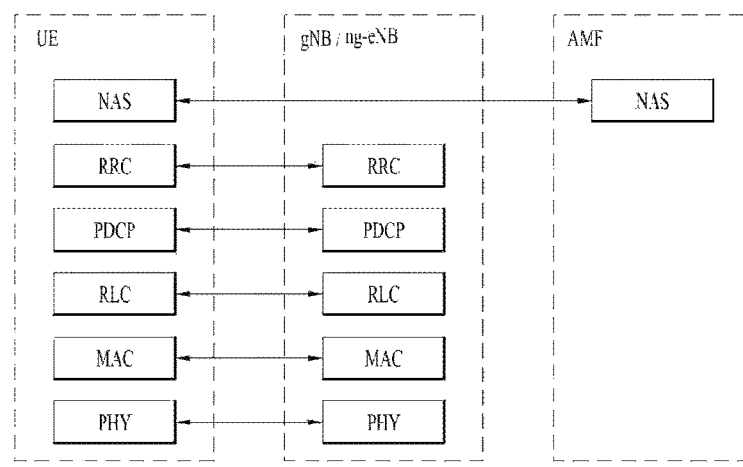
(a) Control-Plane Protocol Stack
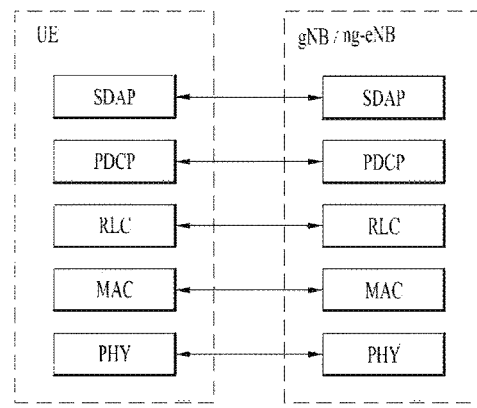
(b) User-Plane Protocol Stack 【Figure 7】
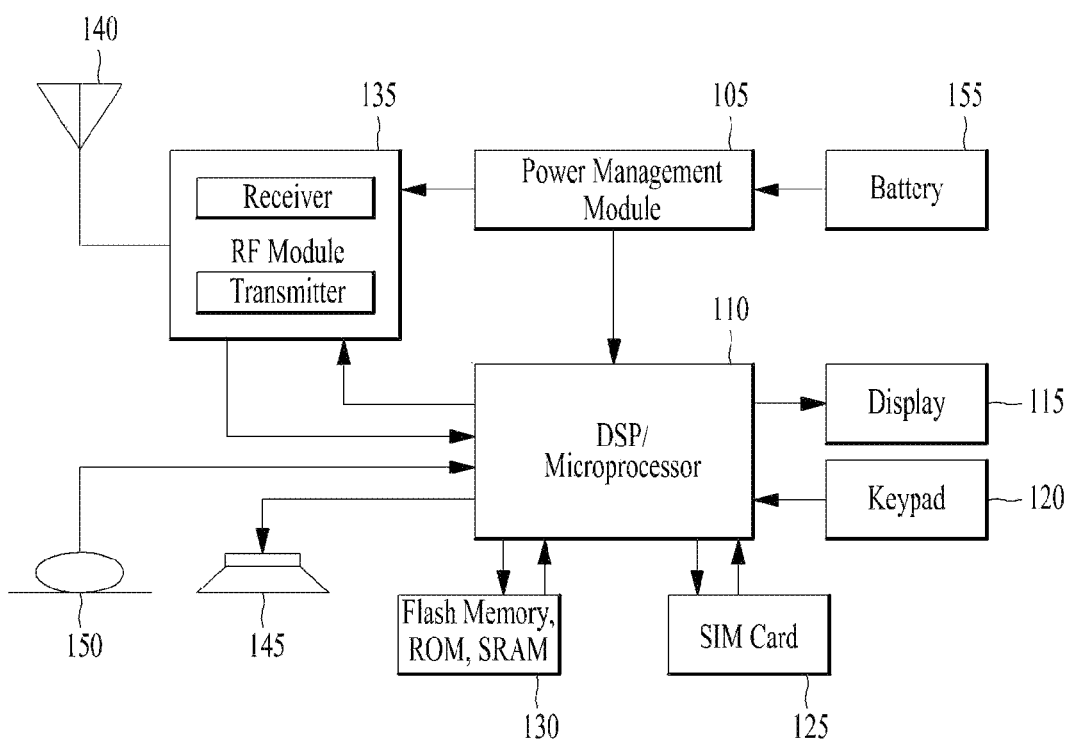
【Figure 8】
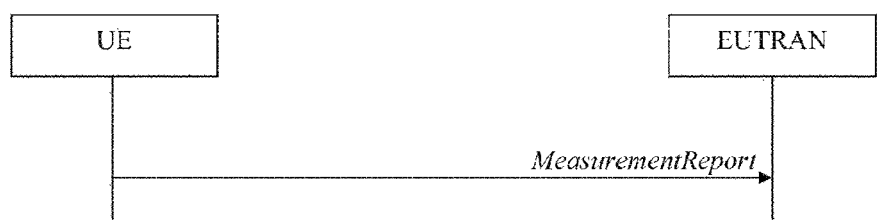

【Figure 9】
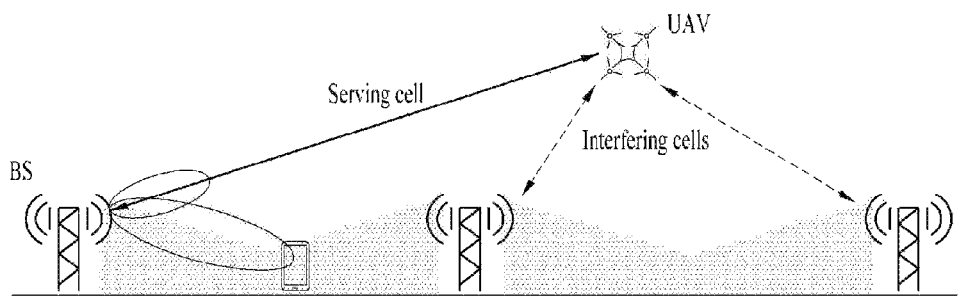
【Figure 10】
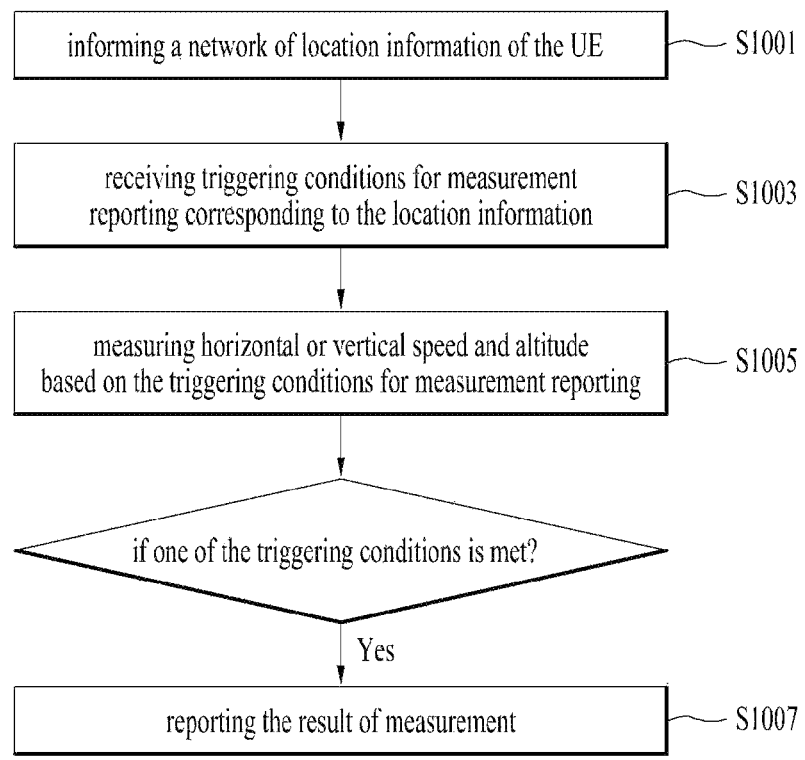

[Figure 11]
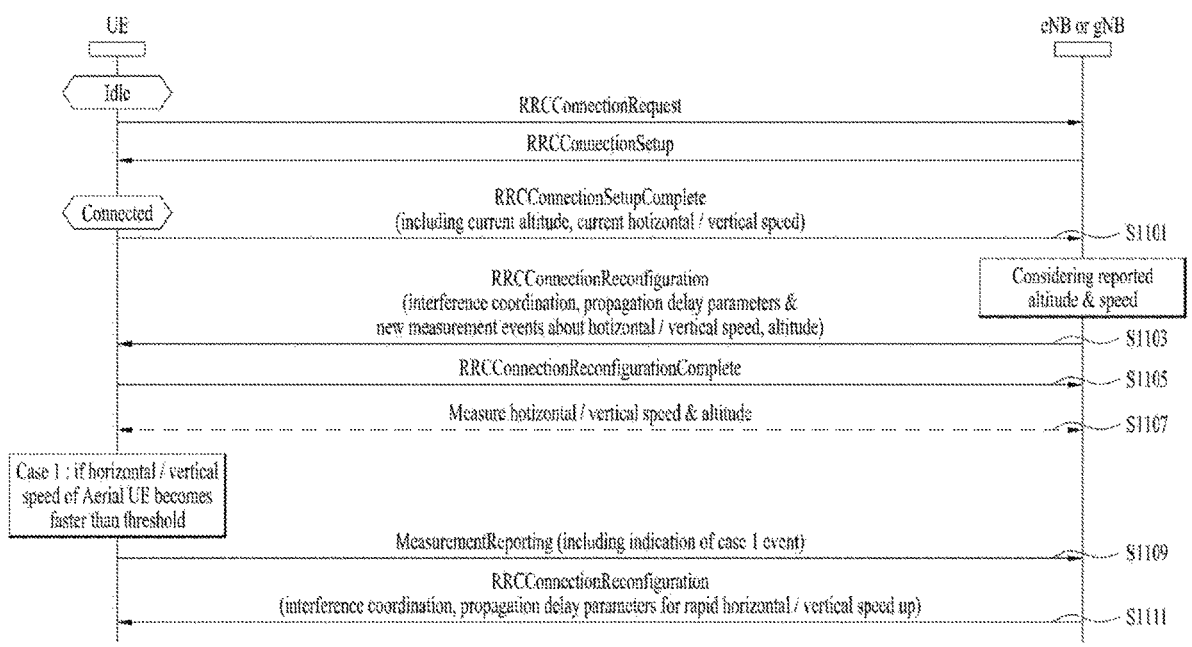

【Figure 12】
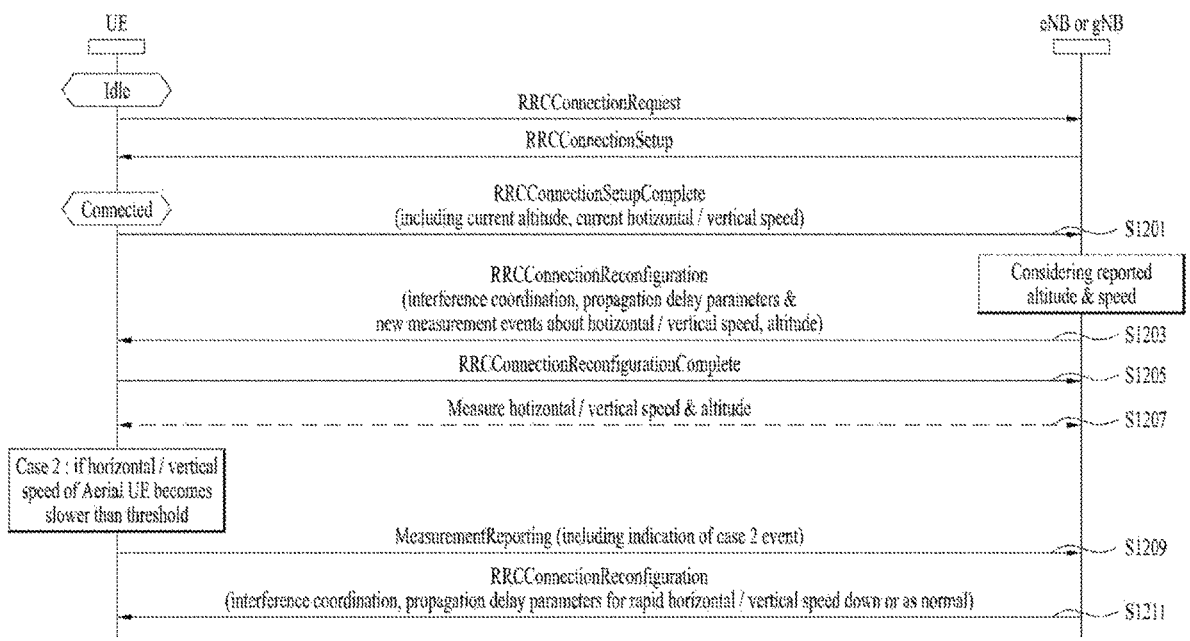

[Figure 13]
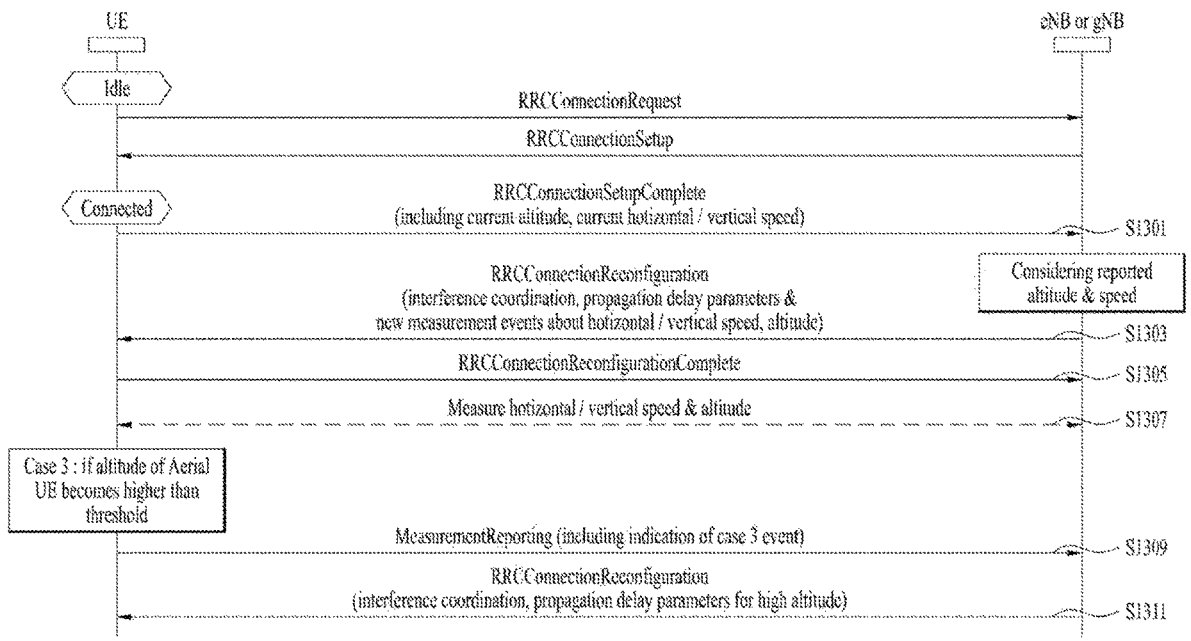

[Figure 14]
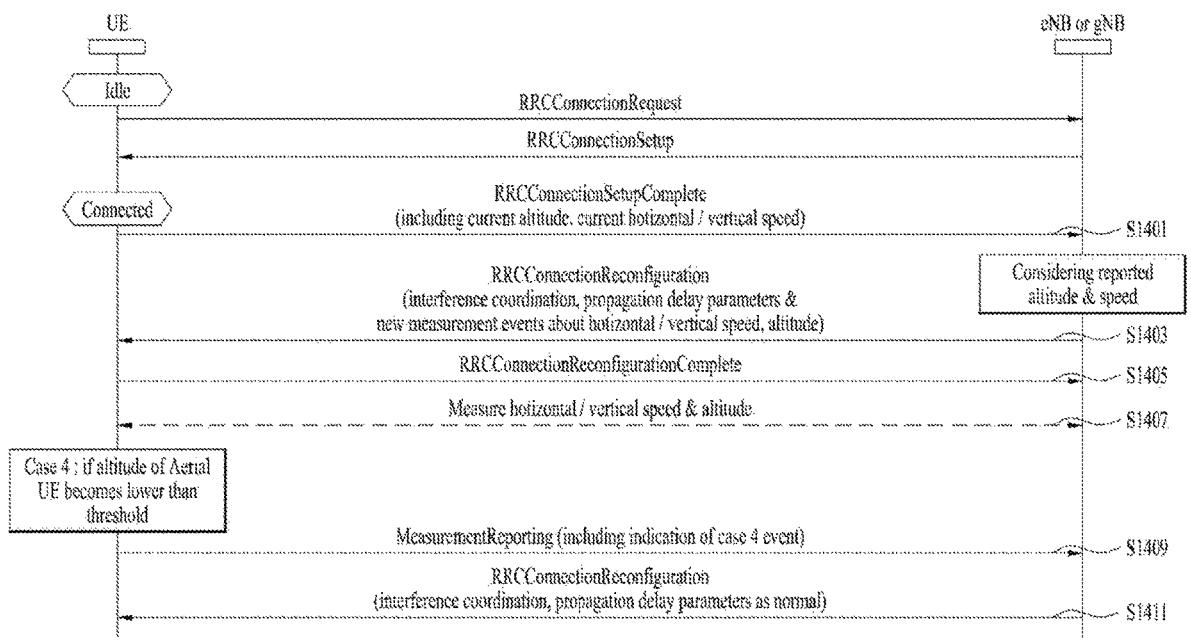

METHOD FOR PERFORMING MEASUREMENT FOR AERIAL UE IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/004423, filed on Apr. 17, 2018, which claims the benefit of U.S. Provisional Application No. 62/488,143, filed on Apr. 21, 2017. The disclosures of the prior applications are incorporated by reference in their entirety.

TECHNICAL FIELD

The present invention relates to a wireless communication system and, more particularly, to a method for performing measurement for aerial UE in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3G PP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARD)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

FIG. 2 is a block diagram illustrating network structure of NG Radio Access Network (NG-RAN) architecture.

*7An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

*11An object of the present invention devised to solve the problem lies in a method and device for performing measurement for aerial UE in wireless communication system.

There have been increasing interests in covering the aerial vehicles such as drones with cellular networks. The use cases of commercial drones are growing very rapidly and include package delivery, search-and-rescue, monitoring of critical infrastructure, wildlife conservation, flying cameras, and surveillance.

Furthermore, there are two types of "drone UE" are more considered in the field. One is a drone equipped with a cellular module certified for aerial usage. On the other hand, there might be a drone carrying a cellular module that is only certified for terrestrial operation.

LTE is well positioned to serve aerial vehicles such as drones. In fact, there have been increasing field trials involving using LTE networks to provide connectivity to drones. It is predicted that a rapid and vast growth in the drone industry will bring new promising business opportunity for LTE operators.

However, the current location reporting procedure is a periodic mechanism. Thus, when the aerial UE is not moving place to place e.g. when this UE is hovering over the same area, the current reporting mechanism would cause unnecessary signalling overhead in uplink. On the other hand, when the aerial UE speed up/down rapidly or going up/down drastically, if a reporting period is configured inappropriately, the current reporting mechanism would not follow up the radio variation related to the UE location.

Thus, it is definitely needed a way that the aerial UE informs current location information to LTE network.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In our view, event triggering condition can resolve these potential problems. If the aerial UE is able to trigger the UE location reporting information using some thresholds for the change of altitude or speed, the aerial UE can save the unnecessary signalling by periodic reporting and appropriately informs to the network even in case of the rapid location change. To support event-triggering location measurement for the aerial UE, the thresholds could be used to inform high/low altitude conditions and high/low speed conditions.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2 is a block diagram illustrating network structure of NG Radio Access Network (NG-RAN) architecture;

FIG. 3a is a block diagram illustrating network structure of an evolved universal mobile telecommunication system (E-UMTS), and FIG. 3b is a block diagram depicting architecture of a typical E-UTRAN and a typical EPC;

FIG. 4 is a diagram showing a control plane and a user plane of a radio interface protocol between a UE and an E-UTRAN based on a 3rd generation partnership project (3GPP) radio access network standard;

FIG. 5 is a view showing an example of a physical channel structure used in an E-UMTS system;

FIG. 6 is a diagram showing a control plane and a user plane of a radio interface protocol between a UE and a NG-RAN based on a 3rd generation partnership project (3GPP) radio access network standard.

FIG. 7 is a block diagram of a communication apparatus according to an embodiment of the present invention;

FIG. 8 is a diagram for performing measurement reporting by a UE in wireless communication system;

FIG. 9 is an illustration of wide-area wireless connectivity for low altitude small unmanned aerial vehicles (UAVs) with terrestrial cellular network;

FIG. 10 is a conceptual diagram for performing measurement for aerial UE in wireless communication system according to embodiments of the present invention; and FIGS. 11 to 14 are examples for performing measurement for aerial UE in wireless communication system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD)

scheme in the present specification, the embodiments of the present invention may be easily modified and applied to a half-duplex FDD (H-FDD) scheme or a time division duplex (TDD) scheme.

FIG. 3a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 3a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 3b is a block diagram depicting architecture of a typical E-UTRAN and a typical EPC.

As illustrated in FIG. 3b, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 6 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

FIG. 7 is a block diagram of a communication apparatus according to an embodiment of the present invention.

The apparatus shown in FIG. 7 can be a user equipment (UE) and/or eNB adapted to perform the above mechanism, but it can be any apparatus for performing the same operation.

As shown in FIG. 7, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 7 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 7 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 8 is a diagram for performing measurement reporting by a UE in wireless communication system.

If security has been activated successfully, the UE shall consider any neighbouring cell detected on the associated frequency to be applicable for each measId included in the measIdList within VarMeasConfig, if the corresponding reportConfig includes a purpose set to reportStrongestCellsForSON:

Else if the corresponding reportConfig includes a purpose set to reportCGI, the UE shall consider any neighbouring cell detected on the associated frequency/set of frequencies (GERAN) which has a physical cell identity matching the value of the cellForWhichToReportCGI included in the corresponding measObject within the VarMeasConfig to be applicable;

Else if the corresponding reportConfig includes a purpose set to reportLocation, the UE shall consider only the PCell to be applicable.

If the purpose is included and set to reportStrongestCells or to reportStrongestCellsForSON or to reportLocation and if a (first) measurement result is available, and if the purpose is set to reportLocation, the UE shall initiate the measurement reporting procedure, immediately after both the quantity to be reported for the PCell and the location information become available.

The purpose of this procedure is to transfer measurement results from the UE to E-UTRAN. The UE shall initiate this procedure only after successful security activation.

For the measId for which the measurement reporting procedure was triggered, the UE shall set the measResults within the MeasurementReport message as follows:

*75i) set the measId to the measurement identity that triggered the measurement reporting;

ii) set the measResultPCell to include the quantities of the PCell;

iii) set the measResultServFreqList to include for each SCell that is configured, if any, within measResultSCell the quantities of the concerned SCell, if available according to performance requirements, except if purpose for the reportConfig associated with the measId that triggered the measurement reporting is set to reportLocation; and iv) if the reportConfig associated with the measId that triggered the measurement reporting includes reportAddNeighMeas; for each serving frequency for which measObjectId is referenced in the measIdList, other than the frequency corresponding with the measId that triggered the measurement reporting; set the measResultServFreqUst to include within measResultBestNeighCell the physCellId and the quantities of the best non-serving cell, based on RSRP, on the concerned serving frequency.

If the includeLocationInfo is configured in the corresponding reportConfig for this measId or if purpose for the reportConfig associated with the measId that triggered the measurement reporting is set to reportLocation; and detailed location information that has not been reported is available, set the content of the locationInfo as follows:

i) include the locationCoordinates and ii) if available, include the gnss-TOD-msec, except if purpose for the reportConfig associated with the measId that triggered the measurement reporting is set to reportLocation.

FIG. 9 is an illustration of wide-area wireless connectivity for low altitude small unmanned aerial vehicles (UAVs) with terrestrial cellular network.

Unmanned Aerial Vehicle (UAVs) includes aircraft that are remotely piloted by ground or other aircraft, such as Remotely Piloted Aircraft, or fully automatic flight programs. Recently, a multi-copter small unmanned aerial vehicle capable of autonomous flight is referred to as a dron.

Unmanned aerial vehicles and drones are typical convergence fields that combine next-generation technologies such as aviation technology, communication/network, sensor, and artificial intelligence.

By utilizing cellular communication supporting broadband and mobility, it is possible to create various use cases such as logistics and infrastructure management by utilizing the high speed movement of drones and the non-visibility flight function of drones.

Aerial UE is sort of unmanned aerial vehicle (UAV). The aerial UE can be applicable to the purpose of military, industry such as delivery service or personal hobby. LTE is well positioned to serve the aerial UEs. In fact, there have been increasing field trials involving using LTE networks to provide connectivity to drones. It is predicted that a rapid and vast growth in the drone industry will bring new promising business opportunity for LTE operators. However current LTE network system cannot support aerial UE's specific traffic characteristics such as interference coordination between aerial UE and legacy UE. It is definitely needed a way how the aerial UE informs current location information to LTE network.

In the LTE specification, for V2X, there is a mechanism to address on issue for speed dependent geographical location information reporting. For V2X WI, we had discussed about the needs of geographical location reporting to control the interference between the V-UEs by allocating different resources to V-UEs which belong to adjacent zone. Therefore, as a way to acquire the V-UE location, periodical location reporting is supported in the current LTE.

In our view, the report information for geographical location could be similarly used to identify aerial UE's positioning. If the aerial UE report the current geographical location to the LTE network, the eNB can take into account the appropriate interference coordination or mobility support. Especially the LocationInfo is including horizontalVelocity, gnss-TOD-msec, and locationCoordinates with altitude information so that we may not need to consider new parameters to identify the aerial UE location. Following the measurement purpose, the aerial UE is able to report its current altitude, horizontal speed and so on if the aerial UE use this measurement handling for reporting of geographical location.

However, the current location reporting procedure is a periodic mechanism. Thus, when the aerial UE is not moving place to place e.g. when this UE is hovering over the same area, the current reporting mechanism would cause unnecessary signalling overhead in uplink. On the other hand, when the aerial UE speed up/down rapidly or going up/down drastically, if a reporting period is configured inappropriately, the current reporting mechanism would not follow up the radio variation related to the UE location.

In our view, event triggering condition can resolve these potential problems. If the aerial UE is able to trigger the UE location reporting information using some thresholds for the change of altitude or speed, the aerial UE can save the unnecessary signalling by periodic reporting and appropriately informs to the network even in case of the rapid location change. To support event-triggering location measurement for the aerial UE, the thresholds could be used to inform high/low altitude conditions and high/low speed conditions.

However current LTE network system cannot support aerial UE's specific propagation characteristics or related interference coordination between aerial UE and legacy UE on the ground. It is definitely needed a way that the aerial UE informs current location information to LTE network.

FIG. 10 is a conceptual diagram for performing measurement for aerial UE in wireless communication system according to embodiments of the present invention.

In this invention, it is proposed of a method of UE informing of location information of the UE, which is used for figuring the network out the current UE's status to coordinate UL/DL interference or support mobility, receiving triggering conditions for measurement reporting corresponding to the location information, performing a measurement for a serving cell and reporting result of the measurement to the serving cell if at least one of the triggering condition for the serving cell is met.

For the aerial UE which speeds up/down rapidly or is going up/down drastically, periodic reporting based on location information may not work properly. This invention proposes an event-based reporting based on the location information newly. For, this, the aerial UE informs a network of location information of the UE (S1001).

Preferably, since the location information includes at least one current horizontal speed, vertical speed or altitude, the network can get information related to the current UE's status to coordinate UL/DL interference or support mobility. The network can figure out current status of the UE which is in airborne status or is staying or hovering on the ground using the location information.

For example, if the UE is airborne, the network needs to configure airborne type of RF parameters or interference handling functions (e.g. ICIC or COMP) since the interference environments are different with the legacy interference environments on the ground.

If the UE capable to fly is staying or hovering on the ground, the network doesn't need to configure airborne type of RF parameters or interference handling functions but may make a legacy configuration for the ground UE.

If the UE is airborne with high altitude and high speed, the network needs to support airborne type of mobility scenarios with the proper cell or proper timing of handover start so that unnecessary mobility procedure is prevented i.e., late handover or ping-pong handover.

If the UE is airborne with low altitude, the network doesn't need to support airborne type of mobility scenarios, but may make a legacy mobility support for the ground UE.

Preferably, when the aerial UE tries to establish RRC Connection in LTE eNB or NR gNB, the aerial UE informs current location information (horizontal speed, vertical speed and altitude) in RRCConnectionSetupComplete message or RRCConnectionResumeComplete message or RRCConnectionReestablishmentComplete message.

When the UE informs network of location information, the UE receives triggering conditions for measurement reporting corresponding to the location information (S1003).

Preferably, the UE can receive radio resource configuration with triggering conditions for measurement reporting via RRC signal message.

When the UE informs network of location information, the eNB or gNB configures radio link parameters through considering the informed location information of the UE via RRCConnectionReconfiguration message. In addition some location related measurement configurations are included in the RRC message. The measurement configuration may be provided by other RRC signal messages e.g., measConfig IE in RRCConnectionResume. Above measConfig IE is consisted of measObjectEUTRA and reportConfigEUTRA for the new events.

In case that the UE is in a RRC_idle state, the UE can receive the triggering conditions for measurement reporting via system information block.

Preferably, the triggering conditions for measurement reporting are associated with informed location information.

For example, when the UE informs horizontal and vertical speed, the eNB or gNB configures to the UE threshold associated with the horizontal and vertical speed.

When the UE informs altitude of the UE, the eNB or gNB configures to the UE threshold associated with the altitude.

The aerial UE measures horizontal speed, vertical speed, or altitude (S1005).

Upon receiving the location related measurement events configuration, the aerial UE sets the measurement configuration events for horizontal speed, vertical speed, or altitude. In case of the speed, the UE is able to get just one of speed configuration between horizontal and vertical. Of course both horizontal speed and vertical speed are needed to the eNB or gNB to estimate exact UE movement state or direction.

Preferably, the location related event-triggering conditions are able to configure like below:

These events are using for detecting the status whether the UE is in airborne status or not with the high speed/altitude vice versa e.g., from airborne status to ground status or from ground status to airborne status.

[Case 1: Horizontal or Vertical speed becomes faster than threshold]

If one of the aerial UE speed is faster than threshold and defined timeToTrigger is met between horizontal or vertical speeds, the UE includes a measurement reporting entry within VarMeasReportList for this measurement event and initiate this measurement reporting procedure to the eNB or gNB. For this measurement reporting procedure, current measurement results like horizontal speed, vertical speed, altitude, current time stamp, RSRP, RSRQ could be included in the MeasurementReport message.

[Case 2: Horizontal orVertical speed becomes slower than threshold]

If one of the aerial UE speed is slower than threshold and defined timeToTrigger is met between horizontal or vertical speeds, the UE includes a measurement reporting entry within VarMeasReportList for this measurement event and initiate this measurement reporting procedure to the eNB or gNB. For this measurement reporting procedure, current measurement results like horizontal speed, vertical speed, altitude, current time stamp, RSRP, RSRQ could be included in the MeasurementReport message.

[Case 3: Altitude of Aerial UE becomes higher than threshold]

If the aerial UE altitude is higher than threshold and defined timeToTrigger is met, the UE includes a measurement reporting entry within VarMeasReportList for this measurement event and initiate this measurement reporting procedure to the eNB or gNB. For this measurement reporting procedure, current measurement results like horizontal speed, vertical speed, altitude, current time stamp, RSRP, RSRQ could be included in the MeasurementReport message.

[Case 4: Altitude of Aerial UE becomes lower than threshold]

If the aerial UE altitude is lower than threshold and defined timeToTrigger is met, the UE includes a measurement reporting entry within VarMeasReportList for this measurement event and initiate this measurement reporting procedure to the eNB or gNB. For this measurement reporting procedure, current measurement results like horizontal speed, vertical speed, altitude, current time stamp, RSRP, RSRQ could be included in the MeasurementReport message.

If at least one of the event-triggering is met for the serving cell, the UE reports the evaluated result to the serving cell to get reconfiguration about radio link related parameters or handover command following the changed level of speed/altitude (S1007).

Preferably, the evaluated result includes at least one includes current location information, information for time stamp, Reference symbol received power (RSRP), or Reference symbol received quality (RSRQ) of the UE.

[Case 1: Horizontal or Vertical Speed Becomes Faster than Threshold]

Upon receiving measurement report from UE, the eNB or gNB can figure specific UE movement and direction through the horizontal, vertical speed. Then the eNB or gNB reconfigure UE radio link parameters to coordinate interference and appropriate measurement with new speed scaling parameters might be applied by faster speed state i.e., sending RRCConnectionReconfiguration. The eNB or gNB also should consider supporting mobility to neighbour cell with the faster speed. Especially the UE could be considered rapid vertical or horizontal speed up by the eNB or gNB.

[Case 2: Horizontal or Vertical Speed Becomes Slower than Threshold]

Upon receiving measurement report from UE, the eNB or gNB can figure specific UE movement and direction through the horizontal, vertical speed. Then the eNB or gNB reconfigure UE radio link parameters to coordinate interference and appropriate measurement with new speed scaling parameters could be applied by slower speed state i.e., sending RRCConnectionReconfiguration. The eNB or gNB also should consider supporting mobility to neighbour cell with the slower speed. Especially the UE could be considered rapid vertical or horizontal speed down by the eNB or gNB.

[Case 3: Altitude of Aerial UE Becomes Higher than Threshold]

Upon receiving measurement report from UE, the eNB or gNB reconfigure UE radio link parameters to coordinate interference and appropriate measurement with new altitude scaling parameters might be applied by higher altitude state i.e., sending RRCConnectionReconfiguration. Different channel model should be applied to UE due to different line-of-sight propagation conditions. The eNB or gNB also should consider supporting data or signal repetition level to prevent loss of transmission in the airspace.

[Case 4: Altitude of Aerial UE Becomes Lower than Threshold]

Upon receiving measurement report from UE, the eNB or gNB reconfigure UE radio link parameters to coordinate interference and appropriate measurement with new altitude scaling parameters might be applied by lower altitude state i.e., sending RRCConnectionReconfiguration. The eNB or gNB also should consider rolling back data or signal repetition level to become normal condition of transmission if the altitude is pretty similar with the legacy UE on the ground.

FIG. 11 is an example for performing measurement for aerial UE in wireless communication system according to embodiments of the present invention.

During RRC connection procedure, the aerial UE informs current location information (horizontal speed, vertical speed and altitude) in RRCConnectionSetupComplete message or RRCConnectionResumeComplete message or RRCConnectionReestablishmentComplete message (S1101).

The eNB or gNB configures radio link parameters through considering the reported aerial UE's location via RRCConnectionReconfiguration message (S1103). In addition some location related measurement configurations are included in the RRC message. The measurement configuration may be provided by other RRC signal messages e.g., measConfig IE in RRCConnectionResume. Above measConfig IE is consisted of measObjectEUTRA and reportConfigEUTRA for the new events.

Upon receiving the location related measurement events configuration, the aerial UE sets the measurement configuration events for horizontal or vertical speed and altitude. In case of the speed, the UE is able to get just one of speed configuration between horizontal and vertical. Of course both horizontal speed and vertical speed are needed to the eNB or gNB to estimate exact UE movement state or direction. After measurement configuration, the UE sends complete message to the eNB or gNB e.g., RRCConnectionReconfigurationComplete (S1105).

The aerial UE measures horizontal or vertical speed and altitude (S1107).

If one of the aerial UE speed is faster than threshold and defined timeToTrigger is met between horizontal or vertical speeds (Case 1), the UE triggers measurement reporting to the eNB or gNB (S1109). For this measurement reporting procedure, current measurement results like horizontal speed, vertical speed, altitude, current time stamp, RSRP, RSRQ could be included in the MeasurementReport message. The measurement reporting entry is included within VarMeasReportList for this measurement event.

Upon receiving measurement report from UE, the eNB or gNB can figure specific UE movement and direction through the horizontal, and vertical speed. Then the eNB or gNB reconfigure UE radio link parameters to coordinate interference and appropriate measurement with new speed scaling parameters might be applied by faster speed state i.e., sending RRCConnectionReconfiguration (S1111). The eNB or gNB also should consider supporting mobility to neighbour cell with the faster speed. Especially the UE could be considered rapid vertical or horizontal speed up by the eNB or gNB.

FIG. 12 is an example for performing measurement for aerial UE in wireless communication system according to embodiments of the present invention.

During RRC connection procedure, the aerial UE informs current location information (horizontal speed, vertical speed and altitude) in RRCConnectionSetupComplete message or RRCConnectionResumeComplete message or RRCConnectionReestablishmentComplete message (S1201).

The eNB or gNB configures radio link parameters through considering the reported aerial UE's location via RRCConnectionReconfiguration message (S1203). In addition some location related measurement configurations are included in the RRC message. The measurement configuration may be provided by other RRC signal messages e.g., measConfig IE in RRCConnectionResume. Above measConfig IE is consisted of measObjectEUTRA and reportConfigEUTRA for the new events.

Upon receiving the location related measurement events configuration, the aerial UE sets the measurement configuration events for horizontal or vertical speed and altitude. In case of the speed, the UE is able to get just one of speed configuration between horizontal and vertical. Of course both horizontal speed and vertical speed are needed to the eNB or gNB to estimate exact UE movement state or direction. After measurement configuration, the UE sends complete message to the eNB or gNB e.g., RRCConnectionReconfigurationComplete (S1205).

The aerial UE measures horizontal or vertical speed and altitude (S1207).

If one of the aerial UE speed is slower than threshold and defined timeToTrigger is met between horizontal or vertical speeds (Case 2), the UE triggers measurement reporting to the eNB or gNB (S1209). For this measurement reporting procedure, current measurement results like horizontal speed, vertical speed, altitude, current time stamp, RSRP, RSRQ could be included in the MeasurementReport message. The measurement reporting entry is included within VarMeasReportList for this measurement event.

Upon receiving measurement report from UE, the eNB or gNB can figure specific UE movement and direction through the horizontal, and vertical speed. Then the eNB or gNB reconfigure UE radio link parameters to coordinate interference and appropriate measurement with new speed scaling parameters could be applied by slower speed state i.e., sending RRCConnectionReconfiguration (S1211). The eNB or gNB also should consider supporting mobility to neighbour cell with the slower speed. Especially the UE could be considered rapid vertical or horizontal speed down by the eNB or gNB.

FIG. 13 is an example for performing measurement for aerial UE in wireless communication system according to embodiments of the present invention.

During RRC connection procedure, the aerial UE informs current location information (horizontal speed, vertical speed and altitude) in RRCConnectionSetupComplete message or RRCConnectionResumeComplete message or RRCConnectionReestablishmentComplete message (S1301).

The eNB or gNB configures radio link parameters through considering the reported aerial UE's location via RRCConnectionReconfiguration message (S1303). In addition some location related measurement configurations are included in the RRC message. The measurement configuration may be provided by other RRC signal messages e.g., measConfig IE in RRCConnectionResume. Above measConfig IE is consisted of measObjectEUTRA and reportConfigEUTRA for the new events.

Upon receiving the location related measurement events configuration, the aerial UE sets the measurement configuration events for horizontal or vertical speed and altitude. In case of the speed, the UE is able to get just one of speed configuration between horizontal and vertical. Of course both horizontal speed and vertical speed are needed to the eNB or gNB to estimate exact UE movement state or direction. After measurement configuration, the UE sends complete message to the eNB or gNB e.g., RRCConnectionReconfigurationComplete (S1305).

The aerial UE measures horizontal or vertical speed and altitude (S1307). If the aerial UE altitude is higher than threshold and defined timeToTrigger is met (Case 3), the UE triggers measurement reporting to the eNB or gNB (S1309). For this measurement reporting procedure, current measurement results like horizontal speed, vertical speed, altitude, current time stamp, RSRP, RSRQ could be included in the MeasurementReport message. The measurement reporting entry is included within VarMeasReportList for this measurement event.

Upon receiving measurement report from UE, the eNB or gNB reconfigure UE radio link parameters to coordinate interference and appropriate measurement with new altitude scaling parameters might be applied by higher altitude state i.e., sending RRCConnectionReconfiguration (S1311). Different channel model should be applied to UE due to different line-of-sight propagation conditions. The eNB or gNB also should consider supporting data or signal repetition level to prevent loss of transmission in the airspace.

FIG. 14 is an example for performing measurement for aerial UE in wireless communication system according to embodiments of the present invention.

During RRC connection procedure, the aerial UE informs current location information (horizontal speed, vertical speed and altitude) in RRCConnectionSetupComplete message or RRCConnectionResumeComplete message or RRCConnectionReestablishmentComplete message (S1401).

The eNB or gNB configures radio link parameters through considering the reported aerial UE's location via RRCConnectionReconfiguration message (S1403). In addition some location related measurement configurations are included in the RRC message. The measurement configuration may be provided by other RRC signal messages e.g., measConfig IE in RRCConnectionResume. Above measConfig IE is consisted of measObjectEUTRA and reportConfigEUTRA for the new events.

Upon receiving the location related measurement events configuration, the aerial UE sets the measurement configuration events for horizontal or vertical speed and altitude. In case of the speed, the UE is able to get just one of speed configuration between horizontal and vertical. Of course both horizontal speed and vertical speed are needed to the eNB or gNB to estimate exact UE movement state or direction. After measurement configuration, the UE sends complete message to the eNB or gNB e.g., RRCConnectionReconfigurationComplete (S1405). The aerial UE measures horizontal or vertical speed and altitude (S1407).

If the aerial UE altitude is lower than threshold and defined timeToTrigger is met (Case 4), the UE triggers measurement reporting to the eNB or gNB (S1409). For this measurement reporting procedure, current measurement results like horizontal speed, vertical speed, altitude, current time stamp, RSRP, RSRQ could be included in the MeasurementReport message. The measurement reporting entry is included within VarMeasReportList for this measurement event.

Upon receiving measurement report from UE, the eNB or gNB reconfigure UE radio link parameters to coordinate interference and appropriate measurement with new altitude scaling parameters might be applied by lower altitude state i.e., sending RRCConnectionReconfiguration (S1411). The eNB or gNB also should consider rolling back data or signal repetition level to become normal condition of transmission if the altitude is pretty similar with the legacy UE on the ground.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method performed by an aerial user equipment (UE) operating in a wireless communication system, the method comprising:
receiving, from a base station via a Radio Resource Control (RRC) message, information that indicates whether the aerial UE is to use one of a first triggering condition or a second triggering condition for measurement reporting to the base station and time-to-trigger information related to a period of time for triggering the measurement reporting, wherein each of the first triggering condition and the second triggering condition is related to altitude and speed of the aerial UE; and
reporting, to the base station, a measurement result based on the first triggering condition or the second triggering condition, and based on the time-to-trigger information,
wherein reporting the measurement result comprises:
based on the information in the RRC message indicating to use the first triggering condition, and based on the first triggering condition being satisfied: reporting a first measurement result related to each of the altitude and the speed of the aerial UE, wherein the first triggering condition includes (i) the altitude of the aerial UE is greater than a first threshold, and (ii) the speed of the aerial UE is greater than a second threshold during the period of time indicated by the time-to-trigger information; and
based on the information in the RRC message indicating to use the second triggering condition, and based on the second triggering condition being satisfied: reporting a second measurement result related to each of the altitude and the speed of the aerial UE, wherein the second triggering condition includes (i) the altitude of the aerial UE is less than a third threshold, and (ii) the speed of the aerial UE is less than a fourth threshold during the period of time indicated by the time-to-trigger information.

2. The method according to claim 1, further comprising: based on reporting the measurement result to the base station:
receiving, from the base station, information regarding at least one of (i) reconfiguration of radio link related parameters, or (ii) a handover command.

3. The method according to claim 1, wherein the first measurement result and the second measurement result each comprises at least one of (i) current location information, (ii) information related to a time stamp, (iii) Reference symbol received power (RSRP), or (iv) Reference symbol received quality (RSRQ) of the aerial UE.

4. The method according to claim 1, further comprising: informing, to a network, location information of the aerial UE via (i) an RRCConnectionResume message, or (ii) an RRCConnectionReconfiguration message.

5. The method according to claim 1, wherein the information in the RRC message that indicates whether the aerial UE is to use one of the first triggering condition or the second triggering condition is received from the base station while the aerial UE is in an RRC connected state.

6. The method according to claim 1, wherein the first threshold related to the altitude is equal to the third threshold related to the altitude.

7. The method according to claim 1, wherein the information in the RRC message further comprises a trigger type that indicates whether the measurement reporting is event-based or periodic.

8. The method according to claim 7, wherein, based on the trigger type indicating that the measurement reporting is event-based:
the information in the RRC message further comprises an event ID that indicates whether the aerial UE is to use the first triggering condition or the second triggering condition.

9. An aerial user equipment (UE) configured to operate in a wireless communication system, the aerial UE comprising:
a Radio Frequency (RF) module;
at least one processor; and
at least one computer memory operably connectable to the at least one processor and storing instructions that, when executed by the at least one processor, perform operations comprising:
receiving, from a base station via a Radio Resource Control (RRC) message through the RF module, information that indicates whether the aerial UE is to use one of a first triggering condition or a second triggering condition for measurement reporting to the base station and time-to-trigger information related to a period of time for triggering the measurement reporting, wherein each of the first triggering condition and the second triggering condition is related to altitude and speed of the aerial UE; and
reporting, to the base station through the RF module, a measurement result based on the first triggering condition or the second triggering condition, and based on the time-to-trigger information,
wherein reporting the measurement result comprises:
based on the information in the RRC message indicating to use the first triggering condition, and based on the first triggering condition being satisfied: reporting a first measurement result related to each of the altitude and the speed of the aerial UE, wherein the first triggering condition includes (i) the altitude of the aerial UE is greater than a first threshold, and (ii) the speed of the aerial UE is greater than a second threshold during the period of time indicated by the time-to-trigger information; and
based on the information in the RRC message indicating to use the second triggering condition, and based on the second triggering condition being satisfied: reporting a second measurement result related to each of the altitude and the speed of the aerial UE, wherein the second triggering condition includes (i) the altitude of the aerial UE is less than a third threshold, and (ii) the speed of the aerial UE is less than a fourth threshold during the period of time indicated by the time-to-trigger information.

10. The aerial UE according to claim 9, wherein the operations further comprise:
   based on reporting the measurement result to the base station:
   receiving, from the base station, information regarding at least one of (i) reconfiguration of radio link related parameters, or (ii) a handover command.

11. The aerial UE according to claim 9, wherein the first measurement result and the second measurement result each comprises at least one of (i) current location information, (ii) information related to a time stamp, (iii) Reference symbol received power (RSRP), or (iv) Reference symbol received quality (RSRQ) of the aerial UE.

12. The aerial UE according to claim 9, wherein the operations further comprise:
   informing, to a network, location information of the aerial UE via (i) an RRCConnectionResume message, or (ii) an RRCConnectionReconfiguration message.

13. The aerial UE according to claim 9, wherein the information in the RRC message that indicates whether the aerial UE is to use one of the first triggering condition or the second triggering condition is received from the base station while the aerial UE is in an RRC connected state.

14. The aerial UE according to claim 9, wherein the first threshold related to the altitude is equal to the third threshold related to the altitude.

\* \* \* \* \*